United States Patent [19]

La Spina et al.

[11] 4,234,694

[45] Nov. 18, 1980

[54] ADDITION COMPOUNDS WHICH CONTAIN PHOSPHORUS AND THEIR USE AS CATALYSTS FOR THE PRODUCTION OF FOAM RESINS WHICH CONTAIN CARBODIIMIDE GROUPS

[75] Inventors: Andrea La Spina, Saronno, Italy; Werner Dietrich; Reinhard Schliebs, both of Cologne, Fed. Rep. of Germany

[73] Assignee: Bayer Aktiengesellschaft, Leverkusen, Fed. Rep. of Germany

[21] Appl. No.: 41,124

[22] Filed: May 21, 1979

Related U.S. Application Data

[63] Continuation-in-part of Ser. No. 2,623, Jan. 8, 1979, abandoned, which is a continuation of Ser. No. 857,059, Dec. 5, 1977, abandoned, which is a continuation of Ser. No. 394,427, Sep. 4, 1973, abandoned.

[51] Int. Cl.$^3$ .................... C08G 18/14; C08G 18/16

[52] U.S. Cl. .................... 521/107; 521/108

[58] Field of Search .................. 521/108, 107

[56] References Cited

U.S. PATENT DOCUMENTS 3,723,364  3/1973  McLaughlin .................... 521/108

*Primary Examiner*—Maurice J. Welsh
*Attorney, Agent, or Firm*—Gene Harsh; Joseph C. Gil

[57] ABSTRACT

Addition compounds based on:
(a) phospholine oxides, phospholine sulphides, phospholane oxides or phospholane sulphides, and
(b) mono-, di- and/or polyalcohols with a molecular weight of 32 to 250 or protonic acids whose N/10 aqueous solutions have a pH of between 1 and 8 or metal salts or acid chlorides are disclosed. These addition compounds are useful as catalysts for the preparation of carbodiimides, particularly carbodiimide foams which have improved properties.

11 Claims, No Drawings

ADDITION COMPOUNDS WHICH CONTAIN PHOSPHORUS AND THEIR USE AS CATALYSTS FOR THE PRODUCTION OF FOAM RESINS WHICH CONTAIN CARBODIIMIDE GROUPS

This application is a continuation-in-part of our Application Ser. No. 002,623, filed Jan. 8, 1979, now abandoned, which was a continuation of Application Ser. No. 857,059, filed Dec. 5, 1977, now abandoned, which is a continuation of Application Ser. No. 394,427, filed Sept. 4, 1973, now abandoned.

It is known to prepare polyurethane foams from polyols and polyisocyanates with the aid of catalysts such as tertiary amines and/or metal compounds. The blowing agents used are generally water and/or organic low boiling compounds, preferably halogenated alkanes such as monofluorotrichloromethane. These polyurethane foams generally have poor flame resistance so that in order to obtain non-combustible and difficultly inflammable foams it is necessary to add flame retarding agents, e.g. compounds which contain phosphorus and/or halogen.

It is also known, e.g. from German Pat. Specification No. 1,130,594, that foam resins containing carbodiimide groups which have better flame resistance than polyurethane foams can be produced from polyisocyanates in the presence of phospholines, their salts and oxides.

Belgian Pat. Specification No. 657,835 also describes a similar process for the production of foam resins which contain carbodiimide groups from polyisocyanates in the presence of phospholine oxide as catalyst.

These processes have, however, numerous disadvantages which prevent their industrial application since foam resins with carbodiimide groups produced by them, which have extremely low densities and substantially closed cells, have a strong tendency to shrink.

Another disadvantage which prevents the practical application of the known processes arises from the fact that at low catalyst concentrations, hardening of the foam takes place only after 1 to 2 hours in the heated mold. Although tough and solid foams which harden rapidly at room temperature can be obtained with higher catalyst concentrations (2-5%, based on the quantity of isocyanate), the reaction mixture then reacts so rapidly that homogeneous mixing of the polyisocyanate and catalyst and delivery of the mixture give rise to practical difficulties in the handling of the apparatus (starting time too short).

On the other hand, foams which have a polycarbodiimide structure have excellent flame resistance even at low densities and are therefore of considerable commercial and economic interest and the solution of the above-mentioned problems therefore constitutes an important technical advance.

New catalysts have now surprisingly been found by which tough, dimensionally stable, i.e. non-shrinking, foam resins with a polycarbodiimide structure which react rapidly at room temperature can be obtained within the usual starting times employed in polyurethane foam technology.

The new catalysts are special addition compounds.

The invention therefore relates to addition compounds comprising the reaction products of a. phospholine oxides, phospholine sulphides, phospholane oxides or phospholane sulphides, and b. mono-, di- and/or polyalcohols with a molecular weight of 32 to 250 or protonic acids whose N/10 aqueous solutions have a pH of between 1 and 8 or metal salts or acid chlorides.

The preferred addition compounds consist of a. 1-methyl-1-oxo-phospholine, 1-methyl-1-oxo-3-chlorophospholine, 1-methyl-1-oxo-2,3-dichlorophospholine, 1-methyl-1-thio-3-chlorophospholine, 1,3-dimethyl-1-oxo-phospholine, 1-phenyl-1-oxo-3-methylphospholine, 1-methoxy-1-oxo-phospholine, 1-methyl-1-thio-phospholine or 1-butyl-1-oxo-phospholine and b. mono-, di- or polyalcohols with a molecular weight of 32 to 250 or protonic acids whose N/10 aqueous solutions have a pH of between 1 and 8 or metal salts or acid chlorides.

Addition compounds consisting of the following components are particularly preferred:

a. 1-methyl-1-oxo-phospholine and
b. glycerol;
a. 1-methyl-1-oxo-phospholine and
b. ethylene glycol;
a. 1-methyl-1-oxo-phospholine and
b. oxalic acid;
a. 1-methyl-1-oxo-phospholine and
b. phosphorus oxychloride;
a. 1-methyl-1-oxo-phospholine and
b. hydrogen chloride;
a. 1-methyl-1-oxo-phospholine and
b. zinc chloride.

The following addition compounds are also mentioned as examples:

a. 1-methyl-1-oxo-phospholine and
b. aluminum trichloride;
a. 1-methyl-1-oxo-phospholine and
b. formic acid;
a. 1-methyl-1-oxo-phospholine and
b. sulphuric acid;
a. 1-methyl-1-oxo-3-chlorophospholine and
b. zinc chloride;
a. 1-methyl-1-oxo-2,3-dichlorophospholine and
b. zinc chloride;
a. 1-methyl-1-oxo-phospholane and
b. zinc chloride;
a. 1-methyl-1-thio-3-chlorophospholine-2 and
b. cadmium chloride;
a. 1-methyl-1-oxo-phospholine and
b. zinc acetate;
a. 1-methyl-1-oxo-phospholine and
b. antimony trichloride;
a. 1-methyl-1-oxo-phospholine and
b. cadmium chloride;
a. 1-methyl-1-oxo-phospholine and
b. iron trichloride;
a. 1-methyl-1-oxo-phospholine and
b. titanium tetrachloride;
a. 1-methyl-1-oxo-phospholine and
b. lithium chloride;
a. 1-methyl-1-oxo-phospholane and
b. phosphorus oxychloride;
a. 1-methyl-1-oxo-3-chlorophospholine and
b. phosphorus oxychloride;
a. 1-methyl-1-oxo-2,3-dichloro-phospholine and
b. phosphorus oxychloride;
a. 1-methyl-1-oxo-phospholine and
b. phosphorus pentachloride;
a. 1-methyl-1-oxo-phospholine and
b. antimony pentachloride;
a. 1-methyl-1-oxo-phospholine and
b. 1-chloro-1-oxo-phospholine;

a. 1-methyl-1-oxo-phospholine and
b. methane phosphonic acid dichlorides;
a. 1-methyl-1-oxo-phospholine and
b. silicon tetrachloride;
a. 1-methyl-1-oxo-phospholine and
b. methyl-trichlorosilane.

The phospholine oxides, phospholine sulphides, phospholane oxides and phospholane sulphides (components a) used for preparing the addition compounds according to the invention are known per se. The phospholine oxides, phospholine sulphides, phospholane oxides and phospholane sulphides used are generally phosphorus compounds of the following formulae

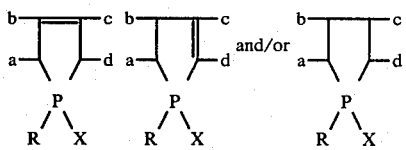

wherein R represents a $C_1$–$C_{18}$ alkyl, $C_2$–$C_{18}$ alkenyl, $C_6$–$C_{14}$ aryl, $C_7$–$C_{20}$ aralkyl, $C_1$–$C_{18}$ alkoxy or $C_6$–$C_{14}$ aroxy radical; a, b, c and d represent hydrogen atoms, halogen atoms (fluorine, chlorine, bromine or iodine atoms), a $C_1$–$C_4$ alkyl, $C_2$–$C_4$ alkenyl, $C_5$–$C_{10}$ cycloalkyl, $C_6$–$C_{10}$ aryl or $C_6$–$C_{14}$ aralkyl radical or polymethylene groups or poly-methine groups which form a cycloaliphatic ring together with two adjacent carbon atoms of the heterocyclic ring; and X represents an oxygen or sulphur atom. In cases where the radicals R and a, b, c and d represent alkyl, alkenyl, aryl, aralkyl, alkoxy or aroxy radicals, these may, of course, be substituted, e.g. by halogen atoms such as chlorine atoms or by nitro groups.

The following are preferably used:
1-methyl-1-oxo-phospholine, 1-methyl-1-oxo-3-chlorophospholine, 1-methyl-1-oxo-2,3-dichlorophospholine, 1-methyl-1-thio-3-chlorophospholine, 1,3-dimethyl-1-oxo-phospholine, 1-phenyl-1-oxo-3-methylphospholine, 1-methoxy-1-oxo-phospholine, 1-methyl-1-thio-phospholine and 1-butyl-1-oxo-phospholine.

The following, for example, may also be used:
1-methyl-1-thio-phospholane, 1-methyl-1-oxo-phospholane, and 1-phenyl-1-oxo-3-methylphospholane.

The following are mentioned as examples of mono-, di- and/or polyalcohols with a molecular weight of 32 to 250 (component b) which may be used for the preparation of the addition compounds according to the invention:
methanol, ethanol, butanol, isopropanol, ethylene glycol, di- and triethylene glycol, propane-1,3- and 1,2-diol, butane-1,3- and -1,4-diol, glycerol, trimethylolpropane, hexane-1,6-diol and hexane-1,2,6-triol. The polyalcohols are generally understood to be trihydric to octahydric alcohols. Monoalcohols and diols and triols are preferably used.

The protonic acids whose N/10 aqueous solutions have a pH of between 1 and 8 (also components b) are preferably mono-, di- and/or polycarboxylic acids with a molecular weight of 46 to 250 as well as mineral acids known per se. The following are examples: formic acid, acetic acid, propionic acid, butyric acid, mono-, di- and trichloroacetic acid, oxalic acid, fumaric acid, maleic acid and adipic acid. Suitable mineral acids include, for example, hydrochloric, hydrobromic and hydriodic acid, o-phosphoric acid, boric acid, sulphuric acid and phosphorous acid.

Suitable salts (also component b) are, for example, zinc chloride, tin(II)bromide, tin(IV)chloride, magnesium chloride, calcium chloride, lithium chloride, lithium iodide, cadmium chloride, manganese(II)chloride and vanadium oxytrichloride. Suitable acid chlorides (also components b) are those which are inorganic or hetero organic and contain e.g. the elements S, P, Si, As and Sb.

The following are, for example, suitable: phosphorus-(III)chloride, phosphorus oxytribromide, phosphorus oxychloride, antimony(V)chloride, silicon(IV)chloride, methyl trichlorosilane, methanephosphonic acid dichloride, methanesulphonic acid chloride, p-toluenesulphonic acid chloride and 1-chloro-1-oxo-phospholine.

To prepare the addition compounds according to the invention, component a. and component b. are mixed in a molar ratio of 1:20 to 20:1, preferably 1:5 to 5:1 and more particularly 3:1 to 1:2. Inert solvents such as benzene, ethyl acetate or acetone and preferably chloroform may be used. The new addition compounds may in part be isolated by crystallization.

The addition compounds according to the invention are frequently oily substances or crystalline compounds which can be identified e.g. by their IR and/or NMR spectra or their formation enthalpy.

When using 1-methyl-1-oxo- or -1-thio-phospholines and -phospholanes, the formation of the addition compounds is indicated by a distinct shift in the NMR spectrum in the position of the methyl proton band. The following Table (1) shows the positions of the bands of these methyl protons of the phospholines and phospholanes used as starting materials depending on the solvents in which the measurements were carried out. A shift in the band position of the compound obtained is given in the corresponding example wherever the shift was used for identifying the compound.

TABLE (1)

| | 1-Methyl-1-oxo- phospholine-2- or -3- | 1-Methyl-1-oxo- phospholane | 1-Methyl-1-oxo-2,3- dichloro- phospholine | 1-Methyl-1-thio- 3-chloro- phospholine-2 |
|---|---|---|---|---|
| CD$_3$OD | 1.67 ppm | | | |
| CDCl$_3$ | 1.63 ppm | 1.61 ppm | 1.78 ppm | 1.93 ppm |
| CD$_3$OCD$_3$ | 1.55 ppm | | 1.75 ppm | |

Another object of this invention is to provide a process for the preparation of phosphorus-containing addition compounds, characterized in that a component
a. consisting of phospholine oxides, phospholine sulphides, phospholane oxides or phospholane sulphides is mixed with a second component
b. consisting of mono-, di- and/or polyalcohols which have a molecular weight of 32 to 250 or protonic acids whose N/10 aqueous solutions have a pH of between 1 and 8, or metal salts or acid chlorides in a molar ratio of 1:20 to 20:1, preferably 5:1 to 1:5 and most preferably 3:1 to 1:2, optionally in the presence of inert solvents.

As a result of using the addition compounds according to the invention as catalysts for the production of foam resins which contain carbodiimide groups, a sufficiently long starting time is available for vigorous mixing of the foaming mixture and its discharge from the mixing apparatus even at high catalyst concentrations and the reaction of the polyisocyanate to produce a foam resin which contains carbodiimide groups can be completed within a short time even at room temperature. A particularly advantageous reaction progress, by which is meant a long starting time followed by a rapid foaming process, is obtainable with addition compounds in which component b. is capable of reacting with isocyanates.

The polycarbodiimide foam resins which can be produced from polyisocyanates with the aid of the addition compounds according to the invention generally have densities of from 5 to 100 kg/m$^3$, preferably 10 to 30 kg/m$^3$ and are dimensionally stable, have excellent heat resistance and are highly non-inflammable. By non-inflammability is meant that the foams are classified as self-extinguishing in accordance with ASTM D 1692 or as flame resistant in accordance with DIN 4102.

Another object of this invention is therefore to provide a process for the preparation of hard foam resins which contain carbodiimide groups from polyisocyanates in the presence of catalysts which form carbodiimide groups and water and/or organic blowing agents, characterized in that the catalysts used are addition compounds consisting of a. phospholine oxides, phospholine sulphides, phospholane oxides or phospholane sulphides and
b. mono-, di- and/or polyalcohols with a molecular weight of 32 to 250 or protonic acids whose N/10 aqueous solutions have a pH of between 1 and 8, or metal salts or acid chlorides, the catalysts being used in an amount of 0.5 to 20% by weight, preferably 1 to 10% by weight, based on the quantity of polyisocyanate.

According to a special variation of this process of the invention, a mixture which is stable in storage at room temperature consisting of polyisocyanate and the catalyst and which may also contain the usual blowing agents such as emulsifiers and/or stabilizers is prepared. The foaming process can then be started by simply heating the mixture to temperatures of between 40° and 200° C., preferably between 50° and 150° C.

Preferred catalysts for this variation of the process are, for example, addition compounds obtained from the following components:

1-methyl-1-oxo-phospholine and zinc chloride;
1-methyl-1-oxo-phospholine and phosphorus oxychloride;
1-methyl-1-oxo-phospholine and calcium chloride;
1-methyl-1-oxo-phospholine and iron trichloride;
1-methyl-1-oxo-phospholine and silicon tetrachloride;
1-methyl-1-oxo-phospholine and titanium tetrachloride;
1-methyl-1-oxo-phospholine and aluminum chloride;
1-methyl-1-oxo-phospholine and 1-chloro-1-oxo-phospholine;
1-methyl-1-oxo-phospholane and phosphorus oxychloride;
1-methyl-1-oxo-phospholane and zinc chloride;
1-methyl-1-oxo-phospholane and phosphorus pentachloride.

A preferred embodiment of the invention is a process for the production of hard foam resins which contain carbodiimide groups from polyisocyanates in the presence of catalysts which form carbodiimide groups and a blowing agent, in the absence of carboxylic acids and imide-forming catalysts, the improvement comprising employing catalysts consisting essentially of addition compounds of (a) phospholine oxides, and (b) mono-, di- and/or polyalcohols with a molecular weight of 32 to 250, wherein component (a) and component (b) are mixed in a molar ratio of 1:20 to 20:1, preferably 1:5 to 5:1, most preferably 3:1 to 1:2, and wherein said catalysts are used in a quantity of 0.5 to 20% by weight, based on the quantity of polyisocyanate.

The starting components used according to the invention may be aliphatic, cycloaliphatic, araliphatic, aromatic or heterocyclic polyisocyanates of the kind described e.g. by W. Siefken in Justus Liebigs Annalen der Chemie, 562, pages 75 to 136, for example ethylene diisocyanate, tetramethylene-1,4-diisocyanate, hexamethylene-1,6-diisocyanate, dodecane-1,12-diisocyanate, cyclobutane-1,3-diisocyanate, cyclohexane-1,3- and -1,4-diisocyanate and any mixtures of these isomers, 1-isocyanato-3,3,5-trimethyl-5-isocyanatomethyl-cyclohexane (German Auslegeschrift No. 1,202,785), hexahydrotolylene-2,4- and -2,6-diisocyanate and any mixtures of these isomers, hexahydrophenylene-1,3- and/or 1,4-diisocyanate, perhydro-diphenylmethane-2,4'-and/or 4,4'-diisocyanate, phenylene-1,3- and -1,4-diisocyanate, tolylene-2,4- and -2,6-diisocyanate and any mixtures of these isomers, diphenylmethane-2,4'- and/or 4,4'-diisocyanate, naphthylene-1,5-diisocyanate, triphenylmethane-4,4',4''-triisocyanate, polyphenyl-polymethylene-polyisocyanates described e.g. in British Pat. Specification Nos. 874,430 and 848,671, which may be obtained by aniline-formaldehyde condensation followed by phosgenation, perchlorinated arylpolyisocyanates described e.g. in U.S. Pat. No. 3,277,138, carbodiimide polyisocyanates described in U.S. Pat. No. 3,152,162, the diisocyanates described in U.S. Pat. No. 3,492,330, allophanate polyisocyanates resulting from the reaction of one mol of hexamethylene diisocyanate with each urethane group present in the reaction product of one mol of diethylene glycol and 2 mols of hexamethylene diisocyanate, described e.g. in British Pat. Specification No. 994,890; Belgian Pat. Specification No. 761,626 and published Dutch Pat. Application No. 7,102,524, isocyanurate polyisocyanates described e.g. in German Pat. Specification Nos. 1,022,789; 1,222,067 and 1,027,394 and in German Offenlegungsschrift No. 1,929,034 which corresponds to U.S. Ser. No. 043,603 (now abandoned) and U.S. Pat. No. 2,004,048, urethane polyisocyanates described e.g. in Belgian Pat. Specification No. 752,261 or in U.S. Pat. No. 3,394,164, polyisocyanates which contain acylated urea groups as described in U.S. Pat. No. 3,517,039, biuret polyisocyanates as described e.g. in U.S. Pat. No. 3,124,605; British Pat. Specification No. 889,050 and French Pat. Specification No. 7,017,514, polyisocyanates prepared by telomerization reactions as described e.g. in Belgian Pat. Specification No. 723,640, the polyisocyanates with ester groups mentioned e.g. in British Pat. Specification No. 956,474 and U.S. Pat. Nos. 3,281,378 and 3,567,763 and in German Pat. Specification No. 1,231,688 and reaction products of the above-mentioned isocyanates with acetals in accordance with U.S. Pat. No. 3,120,502.

The isocyanates used for the invention are preferably aromatic isocyanates.

The distillation residues obtained from the commercial production of isocyanates, which residues contain isocyanate groups, may also be used, and these residues may be dissolved in one or more of the above-mentioned polyisocyanates. Any mixtures of the above-mentioned polyisocyanates may also be used.

It is generally preferred to use commercially readily available polyisocyanates, e.g. tolylene-2,4- and -2,6-diisocyanate and any mixtures of these isomers ("TDI"), polyphenyl-polymethylene-polyisocyanates obtained by aniline/formaldehyde condensation followed by phosgenation ("crude MDI") and polyisocyanates which contain carbodiimide groups, urethane groups, allophanate groups, isocyanurate groups, urea groups or biuret groups ("modified polyisocyanates").

Other preferred polyisocyanates used are the undistilled phosgenation products of tolylene diamine or mixtures of tolylene-2,4-diisocyanate and/or tolylene-2,6-diisocyanate and 5 to 60% by weight, preferably 10 to 50% by weight, of the distillation residue from the preparation of tolylene diisocyanate as well as mixtures of polyisocyanates obtained by the condensation of aniline with formaldehyde followed by phosgenation, and 5 to 50% by weight, preferably 10 to 30% by weight, of the distillation residue from the preparation of tolylene diisocyanate. The reason why such polyisocyanates are suitable is that it has been found that the catalysts according to the invention are insensitive towards the azide compounds present in crude isocyanate mixtures such as crude tolylene diisocyanate or crude diisocyanatodiphenyl methane and in particular towards chlorine compounds.

In the process carried out according to the invention, it is often preferred to add up to 50 equivalents percent, based on the quantity of isocyanate, of compounds with a molecular weight of 62 to 10,000 which contain at least two hydrogen atoms which are reactive with isocyanates, e.g. ethylene glycol, propylene-1,3-glycol, hexane-1,6-diol, tripropylene glycol or polypropylene glycol with a molecular weight of 400.

It is particularly preferred to use compounds which contain at least two hydrogen atoms which are reactive with isocyanates, these compounds generally having a molecular weight of 400 to 10,000. They include compounds which contain amino groups, thiol groups or carboxyl groups but are preferably polyhydroxyl compounds, particularly those which contain 2 to 8 hydroxyl groups and especially those which have a molecular weight of 800 to 10,000, preferably 1000 to 6000, e.g. polyesters, polyethers, polythioethers, polyacetals, polycarbonates and polyester amides which contain at least two and as a rule 2 to 8 but preferably 2 to 4 hydroxyl groups; these are compounds known per se for the production of homogeneous and cellular polyurethanes.

Suitable polyesters with hydroxyl groups are e.g. reaction products of polyhydric alcohols, preferably dihydric and optionally in addition trihydric alcohols, with polybasic and preferably dibasic carboxylic acid. Instead of free polycarboxylic acids, the corresponding polycarboxylic acid anhydrides or polycarboxylic acid eters of low alcohols or mixtures thereof may be used for the preparation of the polyesters. The polycarboxylic acids may be aliphatic, cycloaliphatic, aromatic and/or heterocyclic and may be substituted, e.g. by halogen atoms and/or unsaturated. The following are examples: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid and dimeric and trimeric fatty acids, such as oleic acid, which may be mixed with monomeric fatty acids, dimethylterephthalate and bis-glycol esters of terephthalic acid. Suitable polyhydric alcohols are e.g. ethylene glycol, propylene-1,2-glycol and propylene-1,3-glycol, butylene-1,4- and -2,3-glycol, hexane-1,6-diol, octane-1,8-diol, neopentyl glycol, cyclohexane dimethanol (1,4-bis-hydroxymethylcyclohexane), 2-methylpropane-1,3-diol, glycerol, trimethylolpropane, hexane-1,2,6-triol, butane-1,2,4-triol, trimethylolethane, pentaerythritol, quinitol, mannitol and sorbitol, methyl glycoside, diethylene glycol, triethylene glycol, tetraethylene glycol, polyethylene glycols, tripropylene glycol, polypropylene glycol, dibutylene glycol and polybutylene glycols. The polyesters may include a proportion of polyesters which contain terminal carboxyl groups. Polyesters obtained from lactones, e.g. ε-caprolactone, or hydroxycarboxylic acids, e.g. ω-hydroxycaproic acid may also be used.

The polyethers with two and generally two to eight and preferably two to three hydroxyl groups used according to the invention are also known per se and are prepared e.g. by polymerization of epoxides such as ethylene oxide, propylene oxide, butylene oxide, tetrahydrofuran, styrene oxide or epichlorohydrin, each with itself, e.g. in the presence of $BF_3$, or by addition of these epoxides, which may be used as mixtures or successively, to starting components which contain reactive hydrogen atoms such as alcohols or amines, e.g. water, ethylene glycol, propylene-1,3- or -1,2-glycol, trimethylolpropane, 4,4'-dihydroxy-diphenylpropane, aniline, ammonia, ethanolamine or ethylene diamine. Sucrose polyethers described e.g. in German Auslegeschrift No. 1,064,938 and U.S. Pat. No. 3,153,002 may also be used according to the invention. It is frequently preferred to use those polyethers which contain predominantly primary OH groups (up to 90% by weight, based on all the OH groups present in the polyether). Polyethers which have been modified by vinyl polymerization, e.g. by polymerization of styrene or acrylonitrile in the presence of polyethers (U.S. Pat. Nos. 3,383,351; 3,304,273; 3,523,093 and 3,110,695 and German Pat. No. 1,152,536) are also suitable as well as polybutadienes which contain hydroxyl groups.

Particularly suitable polythioethers are the condensation products of thiodiglycol with itself and/or with other glycols, dicarboxylic acids, formaldehyde, aminocarboxylic acids or amino alcohols. Depending on the cocomponent, these products are polythio mixed ethers, polythioether esters or polythioether ester amides.

Suitable polyacetals are e.g. the compounds prepared from glycols such as diethylene glycol, triethylene glycol, 4,4'-diethoxy-diphenyldimethylmethane, hexanediol and formaldehyde. Polyacetals suitable for the invention may also be prepared by polymerization of cyclic acetals.

Hydroxyl-containing polycarbonates used may be known hydroxyl polycarbonates prepared e.g. by reacting diols such as propane-1,3-diol, butane-1,4-diol and/or hexane-1,6-diol, diethylene glycol, triethylene glycol or tetraethylene glycol with diaryl carbonates, e.g. diphenyl carbonate or phosgene.

The polyester amides and polyamides may be e.g. the predominantly linear condensates obtained from polybasic saturated and unsaturated carboxylic acids or their anhydrides and polyvalent saturated and unsaturated amino alcohols, diamines, polyamines and their mixtures.

Polyhydroxyl compounds which already contain urethane or urea groups as well as natural polyols which may be modified, such as castor oil, carbohydrates or starch may be used. Addition products of alkylene oxides to phenolformaldehyde resins or to urea-formaldehyde resins may be used according to the invention.

Representatives of these compounds which may be used according to the invention have been described e.g. in "High Polymers", Volume XVI, "Polyurethanes, Chemistry and Technology", by Saunders-Frisch, Interscience Publishers, New York, London, Volume I, 1962, pages 32–42 and pages 44–54 and Volume II, 1964, pages 5–6 and 198–199 and in "Kunststoff-Handbuch", Volume VII, Vieweg-Höchtlen, Carl-Hanser-Verlag, Munich, 1966, e.g. on pages 45 to 71.

Water and/or readily volatile organic substances may be used as blowing agents in addition to the carbon dioxide liberated on formation of the polycarbodiimide. The organic blowing agents used may be e.g. acetone, ethyl acetate, methanol, ethanol, halogenated alkanes such as methylene chloride, chloroform, ethylidene chloride, vinylidene chloride, monofluorotrichloromethane, chlorodifluoromethane, or dichlorodifluoromethane, butane, hexane, heptane or diethyl ethers. Compounds which decompose at temperatures above room temperature to liberate gases, for example nitrogen, may also act as blowing agents, e.g. azo compounds such as azoisobutyric acid nitrile. Further examples of blowing agents and details on the use of blowing agents have been described in "Kunststoff-Handbuch", Volume VII, published by Vieweg and Höchtlen, Carl-Hanser-Verlag, Munich, 1966, e.g. on pages 108 and 109, 453 to 455, and 507 to 510.

According to the invention, the usual catalysts of isocyanate chemistry are often used in addition to the addition compounds of the invention. These additional catalysts may be e.g. tertiary amines such as triethylamine, tributylamine, N-methyl-morpholine, N-ethyl-morpholine, N-cocomorpholine, N,N,N',N'-tetramethyl-ethylenediamine, 1,4-diazabicyclo-(2,2,2)-octane, N-methane-N-40 -dimethyl-aminoethylpiperazine, N,N-diethylbenzylamine, bis-(N,N-diethylaminoethyl)-adipate, N,N-diethylbenzylamine, pentamethyl-diethylenetriamine, N,N-dimethylcyclohexyl-amine, N,N,N',N'-tetramethyl-1,3-butanediamine, N,N-dimethyl-β-phenylethylamine, 1,2-dimethylimidazole, and 2-methylimidazole.

Suitable tertiary amines which contain hydrogen atoms which are reactive with isocyanate groups are e.g. triethanolamine, triisopropanolamine, N-methyl-diethanolamine, N-ethyl-diethanolamine, N,N,-dimethyl-ethanolamine and their reaction products which alkylene oxides such as propylene oxide and/or ethylene oxide.

The catalysts may also be silaamines with carbonsilicon bonds described e.g. in German Pat. No. 1,229,290, e.g. 2,2,4-trimethyl-2-silamorpholine or 1,3-diethylamino-methyl-tetramethyl-disiloxane.

Bases which contain nitrogen, such as tetraalkylammonium hydroxides, or alkali metal hydroxides such as sodium hydroxide, alkali metal phenolates such as sodium phenolate, or alkali metal alcoholates such as sodium methylate may also be used as catalysts. Hexahydrotriazines may also be used as catalysts.

Organic metal compounds may also be used as catalysts, particularly organic tin compounds.

The organic tin compounds used are preferably tin-(II) salts of carboxylic acids such as tin(II)acetate, tin-(II)octoate, tin(II)ethyl hexoate and tin(II)laurate and the dialkyl tin salts of carboxylic acids, e.g. dibutyl tin diacetate, dibutyl tin dilaurate, dibutyl tin maleate or dioctyl tin diacetate.

Other examples of catalysts which may be used according to the invention and details of their mode of action are described in Kunststoff-Handbuch, Volume VII, published by Vieweg and Höchtlen, Carl-Hanser-Verlag, Munich 1966, e.g. on pages 96 to 102.

The conventional catalysts of isocyanate chemistry are generally used in an amount of between about 0.001 and 10% by weight, based on the quantity of compunds with a molecular weight of 400 to 10,000 which contain at least two hydrogen atoms which are reactive with isocyanates.

Surface active additives may also be added according to the invention (emulsifiers and foam stabilizers). Suitable emulsifiers are e.g. the sodium salts of castor oil sulphonates or fatty acids or salts of fatty acids with amines such as oleic acid diethylamine or stearic acid diethanolamine. Alkali metal or ammonium salts of sulphonic acids may also be added as surface active additives, for example the alkali metal or ammonium salts of dodecyl benzene sulphonic acid or of dinaphthyl methane disulphonic acid or of fatty acids such as ricinoleic acid or of polymeric fatty acids.

The foam stabilizers used are mainly water-soluble polyether siloxanes. The structure of these compounds is generally such that a copolymer of ethylene oxide and propylene oxide is attached to a polydimethylsiloxane radical. Such foam stabilizers have been described e.g. in U.S. Pat. Nos. 2,834,748 and 3,629,308, and preferably have the formula

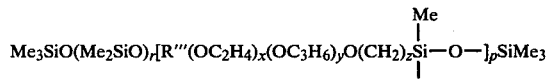

wherein
Me is a methyl group,
r has a value from 3 to 25 inclusive,
R''' is hydrogen or an alkyl group containing from 1 to 4 carbon atoms inclusive,
x has a value from 1 to 25 inclusive (preferably from 4 to 25 inclusive),
y has a value from 0 to 15 inclusive,
at least 25 weight-percent (preferably at least 50 weight-percent) of the groups represented by —(OC$_2$H$_4$)$_x$-(OC$_3$H$_6$)$_y$— are oxyethylene groups,
z has a value from 2 to 3 inclusive, and
p has a value from 1 to 10 inclusive.

Specific siloxane-oxyalkylene copolymers that can be employed as foam stabilizers in this invention are those having the average formulae:

Me$_3$SiO(EtSiO)$_5$(EtSiHO)$_6$OMe$_3$
  |
  CH$_2$CH$_2$O(C$_3$H$_6$O)$_{14}$(C$_2$H$_4$O)$_{18}$C$_4$H$_9$

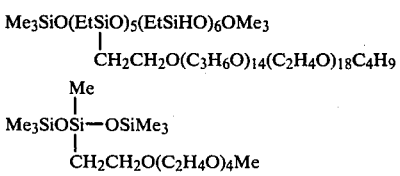

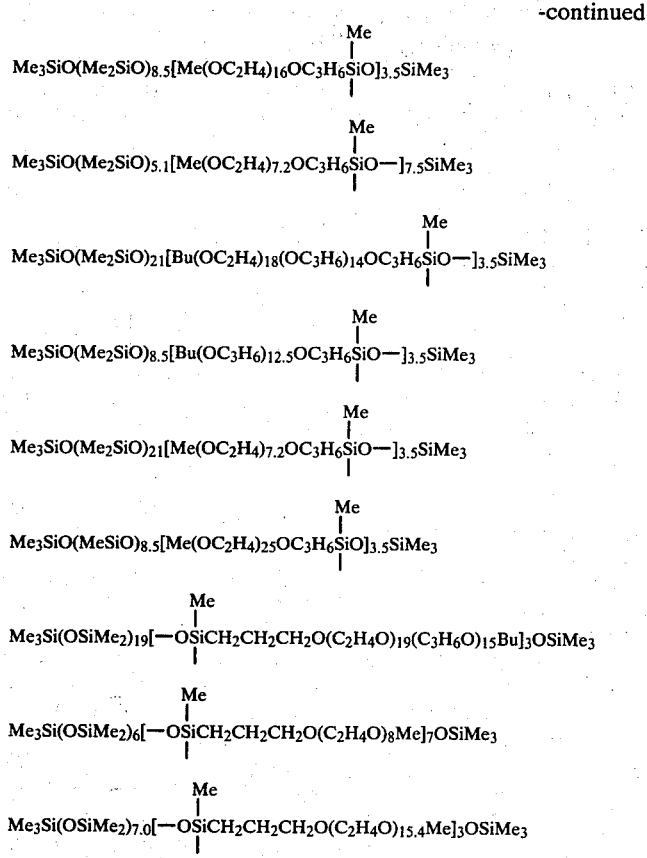

In the above formulae "Me" represents the methyl group, "Et" represents the ethyl group and "Bu" represents the butyl group.

Substances which retard the reaction may also be used according to the invention, e.g. substances which are acid in reaction such as hydrochloric acid or organic acid halides, as may also the known cell regulators such as paraffins or fatty alcohols or dimethylpolysiloxanes as well as pigments or dyes and known flame retarding agents, e.g. tris-chloroethylphosphate or ammonium phosphate and polyphosphate; stabilizers against ageing and weathering, plasticizers and fungistatic and bacteriostatic substances as well as fillers such as barium sulphate, kieselguhr, carbon black or prepared chalk may also be added.

Other examples of surface active additives, foam stabilizers, cell regulators, reaction retarding agents, stabilizers, flame retarding substances, plasticizers, dyes, fillers, fungistatic and bacteriostatic substances which may be used according to the invention if desired and details of their action and method of use have been described in Kunststoff-Handbuch Volume VI, published by Vieweg and Höchtlen, Carl-Hanser-Verlag, Munich 1966, e.g. on pages 103 to 113.

In certain cases, e.g. for foaming undistilled phosgenation products of tolylene diamine, it may be advantageous to use 0.5 to 20% by weight, preferably 1 to 10% by weight, based on the quantity of isocyanate, of known catalysts which form isocyanurate groups in addition to the addition compounds used as catalysts according to the invention.

The catalysts which form isocyanurate groups are preferably those which cause gelling of the isocyanate with isocyanurate formation within 10 minutes at a temperature of 20° C. if they are added in a quantity of 1–10 g per 100 g of organic polyisocyanate, e.g. sodium phenolate, potassium acetate, sodium trichlorophenolate, 2,4,6-tri-(dimethylaminomethyl)-phenol, or a mixture of 80% of ortho- and 20% of paradimethylaminomethylphenol.

The foam resins which can be produced in accordance with the invention have excellent flame resistance which can be improved even further by adding known flame retarding agents such as compounds of halogens such as arsenic trichloride, of nitrogen such as ammonium bromide, of phosphorus such as trichloroethyl phosphate and red phosphorus, and antimony such as antimony trioxide.

Foaming can be carried out either manually or mechanically by known methods. Mechanical foaming is advantageously carried out with mechanical devices in which a mixture of activator-addition compound, foaming agents, optionally polyols, blowing agents and flame retarding agents, etc. as well as the isocyanate component are delivered separately through separate pumps.

The foams according to the invention may be produced e.g. in blocks, panels or webs either intermittently or continuously or also on double conveyor belts. Foams which have been free to expand during foaming generally have a density of 5 to 25 kg/m$^3$ and foams which have been foamed in a mold have a density of 25 to 100 kg/m$^3$.

The foam resins containing carbodiimide groups are suitable for various insulations for insulating against cold and heat. Owing to their excellent flame resistance they are advantageously used in the building industry. Owing to their high heat resistance, they are also suitable for insulating technical plants and in particular heating plants.

EXAMPLES

EXAMPLE 1

1000 g of 1-methyl-1-oxo-phospholine were heated to 50° C. in a three-necked flask with reflux cooler, thermometer and stirrer. 1430 g of glycerol were then added dropwise in portions (2 to 3 g per minute) with constant stirring. The reaction mixture was then heated to 100° C. for 2 hours. An oily product is obtained after cooling to room temperature. Enthalpy measurements show that an addition compound has been formed (see also Example 32 and comparison examples 1 and 2).

EXAMPLE 2

1000 g of 1-methyl-1-oxo-phospholine were heated to 70° C. as described in Example 1. 1670 g of ethylene glycol were then added dropwise in portions with constant stirring. The reaction mixture was then heated to 100° C. for 2 hous. An oily product is obtained after cooling to room temperature. Enthalpy measurements show that an addition compound has been formed.

EXAMPLE 3

1000 g of 1-methyl-1-oxo-phospholine and 500 g of oxalic acid were vigorously mixed at 60° C. as described in Example 1. An addition compound melting at 40° to 42° C. is obtained after cooling to room temperature. On the basis of IR and NMR measurements, the addition compound is found to have the following structure:

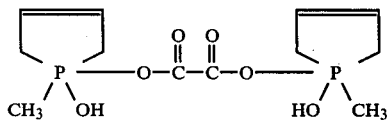

EXAMPLE 4

1000 g of 1-methyl-1-oxo-phospholine were heated to 50° C. as described in Example 1. 1150 g of formic acid were then added portionwise with constant stirring. An addition compound was obtained after cooling to room temperature. On the basis of IR and NMR measurements the addition compound is found to have the following structure:

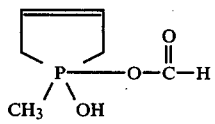

EXAMPLE 5

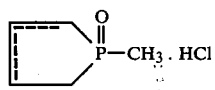

58 g of 1-Methyl-1-oxo-phospholine are introduced into a reaction vessel and anhydrous hydrogen chloride gas is introduced from a bomb with stirring. The strongly exothermic reaction mixture is kept at 100° C. by cooling. The reaction was terminated after 18 g of hydrogen chloride has been taken up. The resulting product melts at 94° to 95° C.

EXAMPLE 6

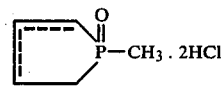

Anhydrous hydrogen chloride gas is introduced into 58 g of 1-methyl-1-oxo-phospholine until the strongly exothermic reaction dies down (maximum reaction temperature 115° C.). 93 g of the following compound

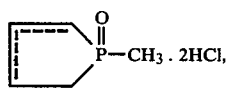

which has a melting point of 76° C. remain behind.

EXAMPLE 7

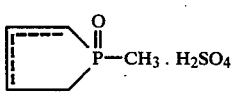

11.5 ml of 50% by weight sulphuric acid are slowly added to 11.6 g of 1-methyl-1-oxo-phospholine, the mixture heating up vigorously. Water is then removed by evaporation under a vacuum of 1 mm Hg at a temperature of 100° C. The resulting compound melts at 38° C. The band position of the methyl protons has shifted to 1.87 ppm (solvent CD$_3$OD).

EXAMPLE 8

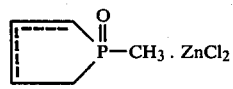

1 Mol of anhydrous zinc chloride was slowly added with stirring to 1 mol of 1-methyl-1-oxo-phospholine dissoled in chloroform. The exothermic reaction is kept at 60° C. by cooling. After removal of chloroform by distillation, the compound remains behind as an oil. The band position of the methyl protons of the compound dissolved in CD$_3$OD has shifted to 1.87 ppm.

EXAMPLE 9

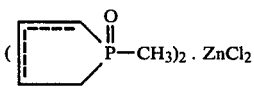

This compound is obtained in the form of an oil by the exothermic reaction as described in Example 8. The band position of the methyl protons of the compound dissolved in CD$_3$OD has shifted to 1.84 ppm.

EXAMPLE 10

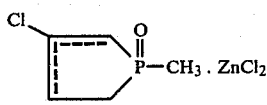

This compound is obtained by an exothermic reaction from 0.5 mol of 1-methyl-1-oxo-3-chloro-phospholine and 0.5 mol of zinc chloride as described in Example 8. The compound melts at 166° C.

EXAMPLE 11

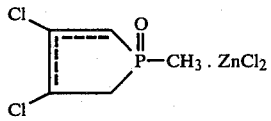

This compound was obtained by a slightly exothermic reaction from 0.5 mol of 1-methyl-1-oxo-2,3-dichlorophospholine and 0.5 mol of zinc chloride (solvent chloroform) after removal of the chloroform by evaporation. It melts at 153° C. The band position of the methyl protons of the compound dissolved in $CD_3OCD_3$ has shifted to 2.15 ppm.

EXAMPLE 12

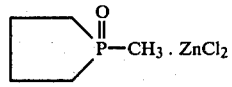

This compound was obtained from 30 g of 1-methyl-1-oxo-phospholane and 34 g of zinc chloride by an exothermic reaction as described above. The shift of the band position of the methyl protons of the compound dissolved in $CDCl_3$ is 1.87 ppm. The compound melts at 62° C.

EXAMPLE 13

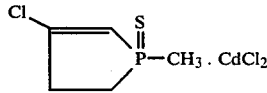

This compound was obtained by adding together 8.5 g of 1-methyl-1-thio-3-chloro-phospholine-2 and 9.3 g of $CdCl_2$ and heating to 90° C. The shift of the band position of the methyl protons of the compound dissolved in $CDCl_3$ is 2.2 ppm.

EXAMPLE 14

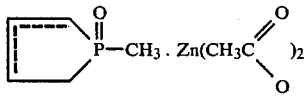

116 g of 1-methyl-1-oxo-phospholine were introduced into a reaction vessel and heated to 100° C. 183.5 g of zinc acetate were added portionwise with stirring. The compound of the following formula

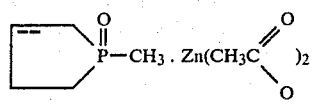

is obtained in the form of an oil. The band position of the methyl protons of the compound dissolved in $CDCl_3$ has shifted to 1.75 ppm.

EXAMPLE 15

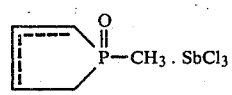

57 g of antimony trichloride were added slowly with stirring to 29 g of 1-methyl-1-oxo-phospholine. The strongly exothermic reaction is kept at 100° C. The resulting oily product dissolved in $CDCl_3$ shows a shift of the band position of the methyl protons to 1.94 ppm.

EXAMPLE 16

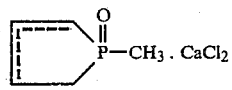

29 g of 1-methyl-1-oxo-phospholine dissolved in 50 ml of chloroform were introduced into a reaction vessel and 28 g of anhydrous $CaCl_2$ were added with stirring. The clear solution obtained is freed from chloroform. The resulting oily compound shows a shift of the band position of the methyl protons to 1.91 ppm (solvent $CDCl_3$).

EXAMPLE 17

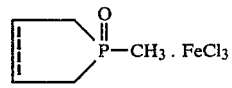

29 g of 1-methyl-1-oxo-phospholine and 40.5 g of ferric chloride are reacted together in 100 ml of chloroform. The compound which melts at 67° C. remains behind after removal of the solvent.

EXAMPLE 18

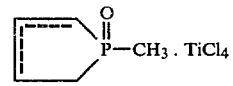

48 g of titanium chloride were slowly added to 30 g of 1-methyl-1-oxo-phospholine dissolved in 100 ml of chloroform. The reaction is strongly exothermic. After removal of the solvent by evaporation, a yellow product which melts at 33° C. is obtained. The product dissolved in a mixture of $CDCl_3$ and $CD_3OCD$ shows a shift of the band position of the methyl protons to 2.21 ppm.

EXAMPLE 19

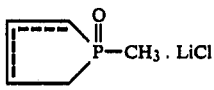

11 g of lithium chloride were rapidly added to 30 g of 1-methyl-1-oxo-phospholine dissolved in 50 ml of chloroform. The reaction temperature rises to 50° C. Stirring is continued for 2 hours at 60° C. and the chloroform is drawn off the resulting clear solution. The solid residue melts at 165° C.

EXAMPLE 20

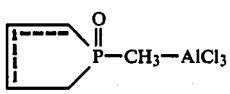

34 g of aluminum chloride are added to 30 g of 1-methyl-1-oxo-phospholine dissolved in 100 ml of chloroform. The compound formed in the exothermic reaction melts at about 46° C. after removal of the chloroform by evaporation. The shift of the band position of the methyl protons of the compound dissolved in CDCl$_3$ amounts to 2.09 ppm.

EXAMPLE 21

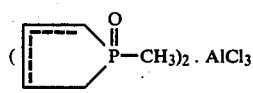

34 g of aluminum chloride are slowly added to 58 g of 1-methyl-1-oxo-phospholine dissolved in 100 ml of chloroform. The reaction is strongly exothermic. A solid which melts at about 110° C. remains behind after removal of the solvent by evaporation.

EXAMPLE 22

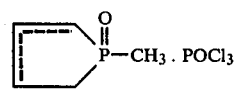

38.5 g of phosphorous oxychloride are added to 29 g of 1-methyl-1-oxo-phospholine with stirring and cooling. The temperature rose to 100° C. The resulting compound has a melting point of 73° C.

EXAMPLE 23

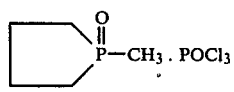

39 g of phosphorus oxychloride were added to 30 g of 1-methyl-1-oxo-phospholane dissolved in chloroform. The reaction is strongly exothermic. The solid which remains after removal of the solvent by evaporation melts at 70° C.

EXAMPLE 24

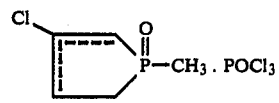

76 g of 1-methyl-1-oxo-3-chloro-phospholine were melted and 77 g of phosphorous oxychloride were slowly added. The resulting product dissolved in CDCl$_3$ shows a shift of the band position of the methyl protons to 3.05 ppm.

EXAMPLE 25

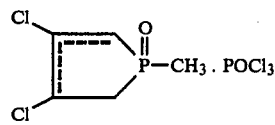

93 g of 1-methyl-1-oxo-2,3-dichloro-phospholine were introduced into a reaction vessel and 77 g of phosphorus oxychloride were added. A slightly exothermic reaction takes place and the phospholine goes into solution. The mixture is kept at 100° C. for 45 minutes, during which time the reaction product solidifies (melting point 108° C.). When dissolved in a mixture of CDCl$_3$ and CD$_3$OCD$_3$, the product shows a shift of the band position of the methyl protons to 3.17 ppm.

EXAMPLE 26

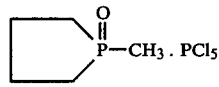

52 g of phosphorous pentachloride were suspended in 100 ml of chloroform, and 30 g of 1-methyl-1-oxo-phospholane were added dropwise. The reaction mixture heats up to boiling. The product which remains behind after removal of the solvent by evaporation melts at 48° C.

EXAMPLE 27

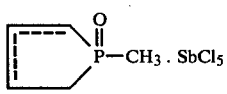

30 g of 1-methyl-1-oxo-phospholine were dissolved in 100 ml of chloroform, and 75 g of antimony pentachloride were slowly added. The compound formed in the resulting exothermic reaction melts at 133° to 135° C. after removal of the solvent by evaporation. The compound dissolved in CD$_3$OCD$_3$ shows a shift of the band position of the methyl protons to 2.39 ppm.

EXAMPLE 28

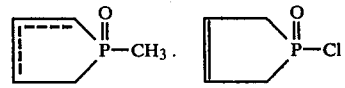

The addition product which melts at 32° C. was obtained from 30 g of 1-methyl-1-oxo-phospholine and 34 g of 1-chloro-1-oxo-phospholine.

EXAMPLE 29

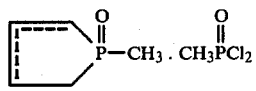

33 g of melted methane phosphonic acid dichloride were added to 30 g of 1-methyl-1-oxo-phospholine dissolved in chloroform. The band position of the methyl protons of the addition compound dissolved in CDCl$_3$ is at 2.05 ppm.

EXAMPLE 30

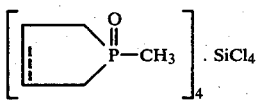

30 g of 1-methyl-1-oxo-phospholine were dissolved in chloroform, and 11 g of silicon tetrachloride were slowly added. The reaction mixture heats up to boiling. The product obtained after removal of the solvent by evaporation shows a shift of the band position of the methyl protons to 2.30 ppm when dissolved in a mixture of CDCl$_3$ and CD$_3$OCD$_3$.

EXAMPLE 31

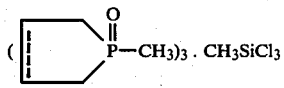

29 g of 1-methyl-1-oxo-phospholine were introduced into 100 ml of chloroform, and 13.5 g of methyl trichlorosilane were slowly added. The addition compound which remains behind when the chloroform has been pumped off shows a shift of the band position of the methyl protons to 2.31 ppm when dissolved in CDCl$_3$.

EXAMPLE 32

A mixture of 17 g of the addition compound described in Example 1 and 1 g of a polysiloxane-polyalkylene glycol (as foam stabilizer) having the average formula:

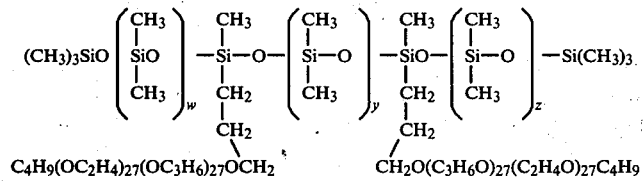

where the sum of w, y and z is about 16, was prepared in a paper beaker. 200 g of crude diphenylmethane diisocyanate having a viscosity of 195 cP/25° C. and an isocyanate content of 31.1% which had been prepared by aniline-formaldehyde condensation followed by phosgenation were added to this mixture with vigorous stirring. The reaction mixture was poured into a paper mold.

Reaction times
$t_R = 15$ sec   $t_R =$ stirring time
$t_L = 20$ sec   $t_L =$ resting time
$t_A = 80$ sec   $t_A =$ setting time
$t_S = 90$ sec   $t_S =$ rising time
$t_K = 95$ sec   $t_K =$ time required for product to become free from tackiness.

Resting time is the time during which the reaction mixture remains optically unchanged.

Setting time is the time required for the reaction to progress to the stage where threads can be drawn from the mixture.

Rising time is the time up to which the reaction mixture rises when left to foam up without restriction.

Time required for the product to become free from tackiness is the time after which articles which come into contact with the foam no longer adhere to its surface.

The foam obtained has the following physical properties:

| | | |
|---|---|---|
| Density | 15 kg/m$^3$ | DIN 53420 |
| Compressive strength | 0.9 kp/cm$^2$ | DIN 53421 |
| Resistance to bending in the heat | 130° C. | DIN 53424 |
| Coefficient of thermal conductivity | 0.028 kcal/m/h/degree | DIN 52612 |
| Burning test on small sample (length of burnt sample) | 65/75 Kl, Fl | DIN 4102. |

Comparison Example 1

A mixture of 7 g of 1-methyl-1-oxo-phospholine and 1 g of a polysiloxane-polyalkylene glycol of Example 32 (as foam stabilizer) was prepared in a paper beaker. 200 g of crude diphenylmethanediisocyanate having a viscosity of 195 cP/25° C. and an isocyanate content of 31.1% which had been prepared by aniline-formaldehyde condensation followed by phosgenation were added to this mixture with vigorous stirring. The reaction mixture was poured into a paper mold.

Reaction times
$t_R = 2$ sec   $t_R =$ stirring time
$t_L = 2$ sec   $t_L =$ resting time
$t_A = 10$ sec   $t_A =$ setting time
$t_S = 20$ sec   $t_S =$ rising time
$t_K = 50$ sec   $t_K =$ time required for product to become free from tackiness.

The foam obtained showed severe shrinkage and physical tests could therefore not be carried out on it.

Comparison Example 2

7 g of 1-methyl-1-oxo-phospholine, 10 g of glycerol, 1 g of a polysiloxane-polyalkylene glycol of Example 32 (as foam stabilizer) and 200 g of the isocyanate used in Example 32 were introduced all at the same time into a paper beaker and vigorously stirred. The reaction mixture and the foam obtained from it showed the same behavior as in comparison Example 1.

EXAMPLE 33

A mixture of 16 g of the addition compound described in Example 2 and 1 g of a polysiloxane-polyalkylene glycol of Example 32 (foam stabilizer) was prepared in a paper beaker. 200 g of crude diphenylmethane diisocyanate having a viscosity of 195 cP/25° C. and an isocyanate content of 31.1% which had been prepared by aniline-formaldehyde condensation followed by phosgenation were added to this mixture with vigorous stirring.

The reaction mixture was poured into a paper mold.

| Reaction times | $t_R$ = 15 sec | $t_R$ = stirring time |
| --- | --- | --- |
| | $t_L$ = 25 sec | $t_L$ = resting time |
| | $t_A$ = 75 sec | $t_A$ = setting time |
| | $t_S$ = 90 sec | $t_S$ = rising time |
| | $t_K$ = 100 sec | $t_K$ = time required for product to become free from tackiness. |

The foam obtained has the following physical properties:

| Density | 18 kg/m$^3$ | DIN 53420 |
| --- | --- | --- |
| Compressive strength | 1.2 kp/cm$^2$ | DIN 53421 |
| Resistance to bending in the heat | 135° C. | DIN 53424 |
| Coefficient of thermal conductivity | 0.027 kcal/m/h/degree | DIN 52612 |
| Burning test on small sample (length of burnt sample) | 65–75 Fl, Kl | DIN 4102. |

EXAMPLE 34

A mixture of 15 g of the addition compound described in Example 3 and 1 g of a polysiloxane-polyalkylene glycol of Example 32 (foam stabilizer) was prepared in a paper beaker. 200 g of crude dimethylmethane diisocyanate having a viscosity of 450 cP/25° C. and an isocyanate content of 31.2% which had been prepared by aniline-formaldehyde condensation followed by phosgenation were added to this mixture with vigorous stirring. The reaction mixture was poured into a paper mold.

| Reaction times | $t_R$ = 20 sec | stirring time |
| --- | --- | --- |
| | $t_L$ = 30 sec | resting time |
| | $t_A$ = 90 sec | setting time |
| | $t_S$ = 100 sec | rising time |
| | $t_K$ = 110 sec | time required for the product to become free from tackiness. |

The foam resin obtained has the following physical properties:

| Density | 16 kg/m$^3$ | DIN 53420 |
| --- | --- | --- |
| Compressive strength | 0.6 kp/cm$^2$ | DIN 53421 |
| Resistance to bending in the heat | 125° C. | DIN 53424 |
| Coefficient of thermal conductivity | 0.03 Kcal/m/h/degree | DIN 52612 |
| Burning test on small sample (length of burnt sample) | 60–70 Kl, Fl | DIN 4102. |

EXAMPLE 35

A mixture of 13 g of the addition compound described in Example 4 and 1 g of a polysiloxane-polyalkylene glycol of Example 32 (foam stabilizer) was prepared in a paper beaker. 200 g of crude diphenylmethane diisocyanate having a viscosity of 915 cP/25° C. and an isocyanate content of 31.3% which had been prepared by aniline-formaldehyde condensation followed by phosgenation were added to this mixture with vigorous stirring. The reaction mixture was poured into a paper mold.

| Reaction times | $t_R$ = 30 sec | stirring time |
| --- | --- | --- |
| | $t_L$ = 30 sec | resting time |
| | $t_A$ = 80 sec | setting time |
| | $t_S$ = 90 sec | rising time |
| | $t_K$ = 110 sec | time required for the product to become free from tackiness. |

The foam resin obtained has the following physical properties:

| Density | 13 kg/m$^3$ | DIN 53420 |
| --- | --- | --- |
| Compressive strength | 0.4 kp/cm$^2$ | DIN 53421 |
| Resistance to bending in the heat | 130° C. | DIN 53424 |
| Coefficient of thermal conductivity | 0.028 Kcal/m/h/degree | DIN 52612 |
| Burning test on small sample (length of burnt sample) | 60–65 Fl, Kl | DIN 4102. |

EXAMPLE 36

8 g of the addition compound described in Example 8, 1 g of a polysiloxane-polyalkylene glycol of Example 32 (foam stabilizer) and 200 g of a prepolymer having a viscosity of 900 cP/25° C. and an isocyanate content of 29.5% which had been prepared from 46 g of tolylene diisocyanate and 12 g of a polyether with OH number 550 which had been obtained by the addition of propylene oxide to trimethylolpropane were mixed in a glass beaker. This mixture is stable in storage for 24 hours at room temperature.

The mixture is then heated to 150° C. for 30 minutes. A tough, hard foam resin with the following physical properties was obtained:

| Density | 19 kg/m$^3$ | DIN 53420 |
| --- | --- | --- |
| Compressive strength | 1.3 kp/cm$^2$ | DIN 53421 |
| Resistance to bending in the heat | 120° C. | DIN 53424 |
| Coefficient of thermal conductivity | 0.028 Kcal/m/h/degree | DIN 52612. |

EXAMPLE 37

7 g of the addition compound described in Example 22, 1 g of a polysiloxane-polyalkylene glycol of Example 32 (foam stabilizer) and 200 g of a mixture of 70% by weight of crude diphenylmethane diisocyanate which had been prepared by aniline formaldehyde condensation followed by phosgenation, and 30% by weight of the distillation residue obtained from the preparation of tolylene diisocyanate were vigorously stirred together as described in Example 36. The isocyanate mixture has an isocyanate content of 29.1% and a viscosity of 1030 cP/25° C. This mixture was then heated to 150° C. for 30 minutes.

A tough, hard foam resin with the following physical properties was obtained:

| Density | 17 kg/m$^3$ | DIN 53420 |
|---|---|---|
| Compressive strength | 0.9 kp/cm$^2$ | DIN 53421 |
| Resistance to bending in the heat | 125° C. | DIN 53424 |
| Coefficient of thermal conductivity | 0.031 Kcal/m/h/degree | DIN 52612 |
| Burning test on small sample (length of burnt sample) | 65–75 Kl, Fl | DIN 4102. |

EXAMPLE 38

A mixture of 15 g of the addition compound described in Example 1, 1 g of a polysiloxane-polyalkylene glycol of Example 32 (foam stabilizer) and 2 g of water was prepared in a paper beaker. 200 g of an isocyanate mixture used as in Example 17 were added to this mixture with vigorous stirring. The reaction mixture was poured into a paper mold.

| Reaction times | $t_R$ = 15 sec | stirring time |
|---|---|---|
| | $t_L$ = 25 sec | resting time |
| | $t_A$ = 90 sec | setting time |
| | $t_S$ = 110 sec | rising time |
| | $t_K$ = 105 sec | time required for the product to become free from tackiness. |

The foam resin obtained has the following physical properties:

| Density | 11 kg/m$^3$ | DIN 53420 |
|---|---|---|
| Compressive strength | 0.5 kp/cm$^2$ | DIN 53421 |
| Resistance to bending in the heat | 135° C. | DIN 53424 |
| Coefficient of thermal conductivity | 0.029 Kcal/m/h/degree | DIN 52612 |
| Burning test on small sample (length of burnt sample) | 80–90 Kl, Fl | DIN 4102. |

EXAMPLE 39

A mixture of 7 g of the addition compound described in Example 8, 1 g of a polysiloxane-polyalkylene glycol of Example 32 (foam stabilizer) and 200 g of a crude tolylene diisocyanate having an NCO content of 38% and a viscosity of 100 cP (at 25° C.) was prepared in a glass beaker. This isocyanate mixture has a viscosity of 2060 cP/25° C. and an isocyanate content of 33.6%. The mixture was then stored at 160° C. for 30 minutes. A tough, hard foam resin which had the following physical properties was obtained:

| Density | 16 kg/m$^3$ | DIN 53420 |
|---|---|---|
| Compressive strength | 1.2 kp/cm$^2$ | DIN 53421 |
| Resistance to bending in the heat | 135° C. | DIN 53424 |
| Coefficient of thermal conductivity | 0.032 Kcal/m/h/degree | DIN 52612 |
| Burning test on small sample (length of burnt sample) | 75–85 Fl, Kl | DIN 4102. |

EXAMPLE 40

A mixture of 15 g of the addition compound described in Example 1, 7 g of N,N',N''-tris-(dimethylaminopropyl)-s-triazine and 1 g of a polysiloxane-polyalkylene glycol of Example 32 (foam stabilizer) was prepared in a paper beaker.

200 g of a crude tolylene diisocyanate having an NCO content of 38% and a viscosity of 100 cP/25° C. were added to this mixture with vigorous stirring. The reaction mixture was poured into a paper mold.

| Reaction times | $t_R$ = 10 sec | stirring time |
|---|---|---|
| | $t_L$ = 25 sec | resting time |
| | $t_A$ = 85 sec | setting time |
| | $t_S$ = 100 sec | rising time |
| | $t_K$ = 120 sec | time required for the product to become free from tackiness. |

The foam resin obtained has the following physical properties:

| Density | 13 kg/m$^3$ | DIN 53420 |
|---|---|---|
| Compressive strength | 0.9 kp/cm$^2$ | DIN 53421 |
| Resistance to bending in the heat | 153° C. | DIN 53424 |
| Coefficient of thermal conductivity | 0.027 Kcal/m/h/degree | DIN 52612 |
| Burning test on small sample (length of burnt sample) | 70–80 Fl, Kl | DIN 4102. |

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. In a process for the production of hard foam resins which contain carbodiimide groups from polyisocyanates in the presence of catalysts which form carbodiimide groups and a blowing agent, in the absence of carboxylic acids and imide-forming catalysts, the improvement comprising employing catalysts consisting essentially of addition compounds comprising the reaction products of (a) phospholine oxides, and (b) mono-, di- and/or polyalcohols with a molecular weight of 32 to 250, wherein component (a) and component (b) are mixed in a molar ratio of 1:20 to 20:1 and wherein said catalysts are used in a quantity of 0.5 to 20% by weight, based on the quantity of polyisocyanate.

2. The process of claim 1, wherein component (a) and component (b) are mixed in a molar ratio of 1:5 to 5:1.

3. The process of claim 1, wherein component (a) and component (b) are mixed in a molar ratio of 3:1 to 1:2.

4. The process of claim 1, wherein said catalyst is employed in an amount of 1–10% by weight.

5. The process according to claim 1, wherein up to 50 equivalents percent, based on the quantity of isocyanate, of compounds which contain at least two hydrogen atoms which are reactive with isocyanates and which have a molecular weight of 62 to 10,000 are included.

6. The process of claim 5, wherein said compounds with at least two hydrogen atoms which are reactive with isocyanates have a molecular weight of 400-10,000.

7. The process of claim 1, wherein in addition to the catalysts which form carbodiimide groups, 0.5 to 20% by weight based on the quantity of isocyanate, of catalysts which form isocyanurate groups are added.

8. The process of claim 7, wherein 1-10% of catalysts which form isocyanurate groups are added.

9. The process of claim 1, wherein the polyisocyanates used are undistilled phosgenation products of tolylene diamine and 5 to 60% by weight of the distillation residue obtained from the preparation of tolylene diisocyanate.

10. The process of claim 1, wherein the polyisocyanates used are mixtures of polyisocyanates obtainable by the condensation of aniline with formaldehyde followed by phosgenation and 5 to 50% by weight of the distillation residue obtained from the preparation of tolylene diisocyanate.

11. The process of claim 1, wherein the catalyst employed is an addition compound of (a) phospholine oxide and (b) glycerine.

* * * * *